May 12, 1931. J. C. BAREFOOT 1,804,853
SAFETY DEVICE FOR USE ON A DOUGH ROLLING MACHINE COMMONLY
KNOWN TO THE BAKING INDUSTRY AS A DOUGH BRAKE
Filed April 17, 1930  2 Sheets-Sheet 1
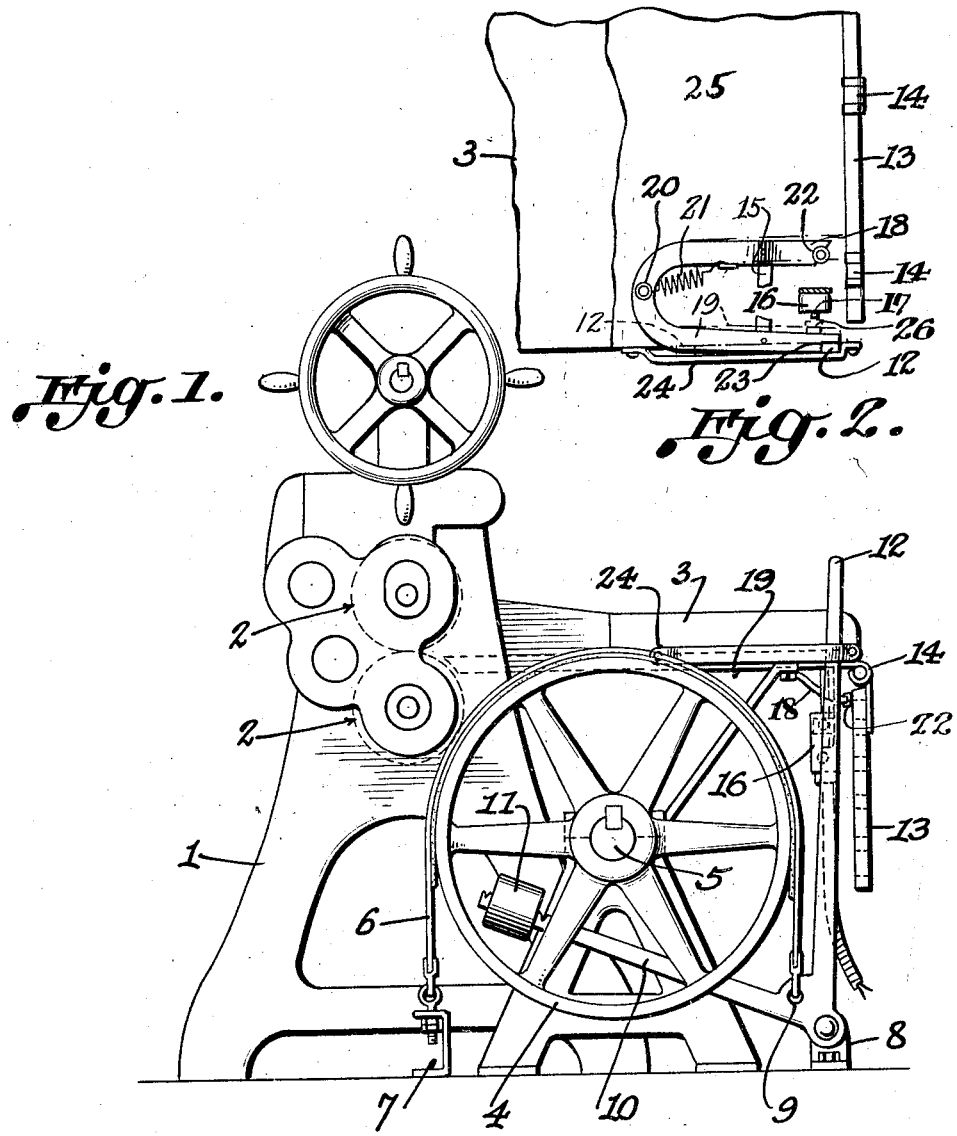
Inventor
Josie C. Barefoot
By Lister Sargent
Attorney

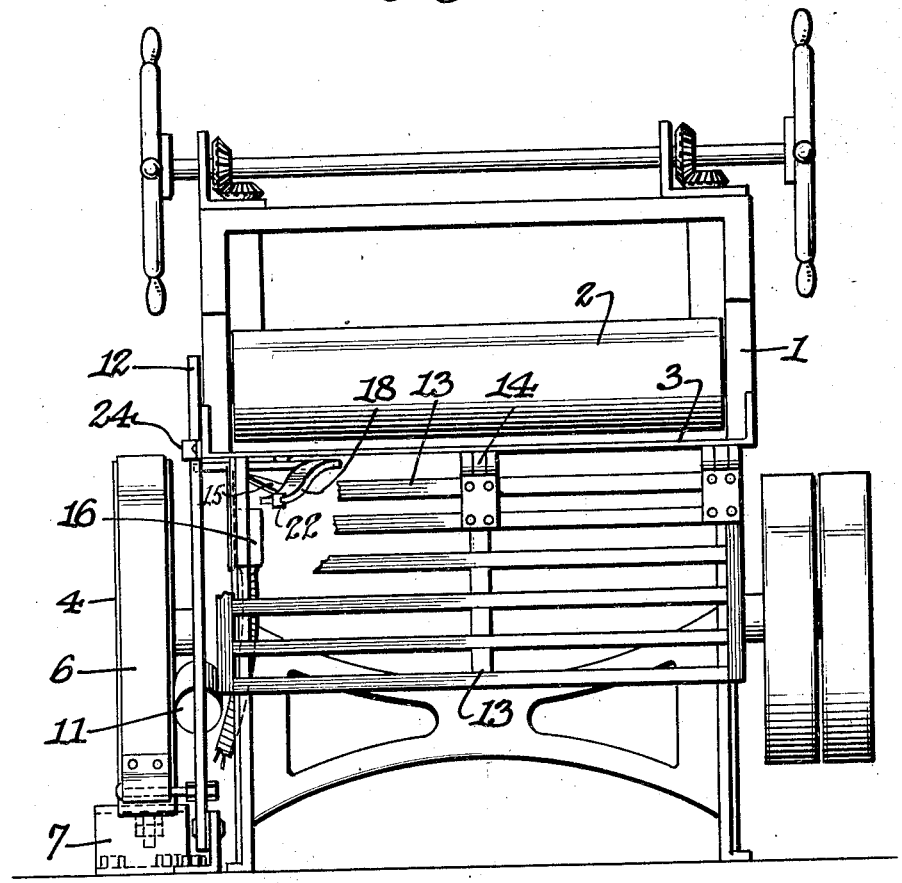
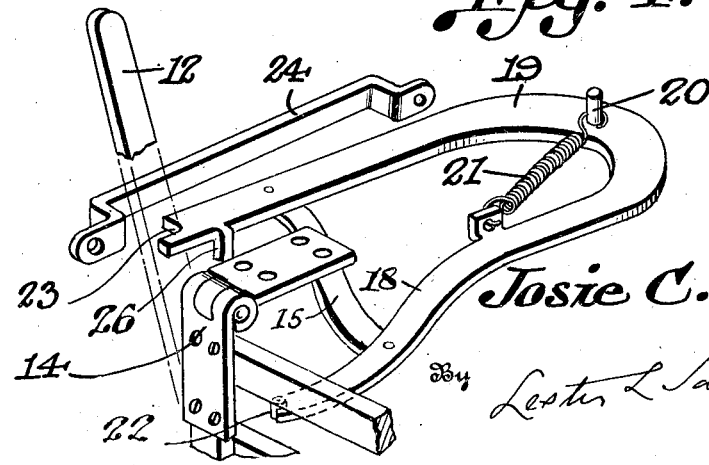

Patented May 12, 1931

1,804,853

UNITED STATES PATENT OFFICE

JOSIE C. BAREFOOT, OF CHARLOTTE, NORTH CAROLINA

SAFETY DEVICE FOR USE ON A DOUGH ROLLING MACHINE COMMONLY KNOWN TO THE BAKING INDUSTRY AS A DOUGH BRAKE

Application filed April 17, 1930. Serial No. 445,151.

The object of my invention is to provide a novel and efficient device for use on a dough rolling machine commonly known to the baking industry as a dough brake, which will be substantially automatic in operation to stop the machine when the operator gets his hand in a dangerous position and which also has novel means for both turning off the electric current that operates the machine and also applying the brake to immediately arrest movement of the heavy rollers of the machine.

Safety devices heretofore devised for machines of this character have substantially failed of their purpose for the reason that they merely shut off the electric current from the machine but did not instantly arrest the movement of the heavy rollers, the momentum of which is considerable and sufficient to crush the operator's hand and arm before they could be stopped, even after the current was shut off.

It is also an object of my invention to provide a relatively simple and efficient mechanism for accomplishing the purposes desired.

I attain these and other objects of my invention by the mechanism illustrated in the accompanying drawings, in which,—

Figure 1 is a side elevation of my invention;

Fig. 2 is a top plan view of the switch controlling mechanism, the apron 13 being broken away to show this mechanism;

Fig. 3 is an end elevation of the machine, a portion being broken away and shown in section; and Fig. 4 is a detailed perspective view of the switch controlling mechanism detached from the machine.

Like numerals designate like parts in each of the several views.

Referring to the accompanying drawings, there is illustrated a dough rolling machine 1 having the dough rollers 2 mounted one above the other and geared together and the usual apron 3 on which the dough is placed before it passes through the machine. The machine is provided with a fly wheel 4 keyed to the shaft 5 which shaft extends across the body of the machine and is operatively connected with a suitable source of power.

I provide a brake band 6 adapted to frictionally engage the fly wheel 4 to brake same and having one end fastened to the floor or base of the machine by a suitable clamp 7 and having the other end fastened at 9 to the pivoted weighted arm 10, which member carries an adjustable weight 11 and is pivotally mounted on the bracket 8. The brake applying lever 10 is provided with brake release lever 12 which engages a recessed portion 23 of the pivoted preferably spring controlled latch or U-bar 19, the brake release lever 12 having a limited movement in the bracket 24, as will be apparent by reference to Figs. 2 and 4.

I provide a depending apron 13 swingably dependent from the bottom portion of the apron 3 by means of hinge (or hinges) 14. I also provide an electric switch 16 mounted on the frame of the machine and having a slidable push button switch 17 with the end of which member 26 contacts, as shown in Fig. 2. The spring-controlled U-bar 19 is pivoted at 20. It may have a suitable brace 15. Member 19 is provided with a spring 21 extending from pivot 20 to an intermediate portion of the spring-controlled U-bar 19 to tend to hold the spring-controlled U-bar in the position shown in Fig. 2, in which position the other arm of the member 19 having the recessed portion 23 is in locking engagement with the brake stop arm 12. The end of member 19 may, if desired, be provided with a roller 22 and the portion of the U-bar designated 18 is curved or sloped downward on one side, as shown in Fig. 4.

In operation the operator places large rolls of bread dough on the table 3 of the machine and it is rolled through a number of times in order to properly prepare the dough for baking. These machines as put out by the manufacturer have no guards on them and people have been seriously injured by getting their hands and arms cut in these rollers. The electric switch which controls the machines is either on the wall near-by or on the machine within easy reach of the operator so that he can cut it off quickly in case of an accident but the trouble has been heretofore that the momentum of the machine after the power is cut off is great enough to injure the hands or arms of the operator before the machine stops. This invention overcomes this dangerous feature of the machine by providing a brake band 6 on the fly wheel or drum 4 which will function to effectually and quickly stop the operation of the heavy rollers of the machine. The brake band is attached to the pivoted brake applying arm 10, which arm is provided with an adjustable weight 11 on its outer end and is integral with or affixed to the brake release lever 12, which is normally held in inoperative position by the notched end 23 of the pivoted latch or U-bar 19 which is releasably held in engagement with the brake release lever 12 by the spring 21. When the operator moves his hand too far toward the dough rollers he will automatically bend his knees and they will strike against the depending apron 13 and press same toward the machine.

When apron 13 is pushed forward the latch or U-bar 19 is swung pivotally over so that its notched end 23 will move out of engagement with the brake release lever 12, whereupon the weight 11 on brake applying arm 10 will cause those members to swing forwardly and thus apply the brake band 6 to the fly wheel or drum 4, which will immediately arrest the rotation of the rollers 2. At the same time the member 26 on U-bar 19 will press against the electric switch 17 cutting off the electric current which operates the rollers of the dough brake.

When members 26 and 17 are engaged it is impossible to switch current on until brake lever 12 is pulled back into slot 23. This provides another safety device. The brake lever 12 presses against bar 19 and holds it against the push-button 17. When the lever 12 is in recess 23 the spring 21 holds the U bar stud 26 off the push-button, but when the lever is pulled out of notch 23 it pushes against the side of the U bar 19 and holds it in contact with the push-button so that the push-button cannot be operated until the lever is pulled back in notch 23.

When the machine has been cut off the stud or button 26 on U-bar 19 is pressed tightly against the electric push button 17 and is held in this position until the brake lever 12 is pulled, after which the operator can cut on the current and start the machine again. This prevents anyone from starting the machine until the safety device is set ready for immediate action in case of accident. The machine cannot be started until the safety device is first put in proper position.

The roller 22 is provided on the downwardly sloping end 18 of U-bar 19 so that it will work easily when it comes in contact with the hinge 14 attached to apron 13 and which operates the cut-off.

What I claim is:

1. In a safety device for a dough rolling machine having a fly wheel, a brake band arranged to be thrown into frictional engagement with a drum, a dependent apron hingedly connected to the machine, and mechanism operatively connecting the apron with the brake band to apply same to the drum when the apron is operated.

2. In a safety device for a dough rolling machine, the combination with a dough rolling machine having a flying wheel, of a brake band adapted to be thrown into frictional engagement with the fly wheel, a weighted brake-applying lever to which said brake band is attached, an apron hingedly connected to the machine and disposed in front of the operator, and mechanical means operatively connecting the apron with the brake-applying lever to cause the frictional engagement of the brake band on the fly wheel to arrest the operation of the machine.

3. In combination with the mechanism defined in claim 2, an electrical switch, and a switch actuating member arranged to simultaneously operate said switch and the aforesaid brake-applying mechanism.

4. In a safety device of the type described, the combination with a dough rolling machine having a fly wheel, of a brake band adapted to frictionally engage said fly wheel, an adjustable weighted lever to which said brake band is attached, a brake releasing arm affixed to said brake-applying lever, a latch member engaging the brake release arm, a swingable apron arranged to actuate the latch member, and an electric switch arranged to be actuated by the aforesaid apron to turn off the source of current supply that operates the machine simultaneously with the application of the brake band to the fly wheel.

5. In a dough rolling machine having a drum or fly wheel, the combination of a brake band adapted to frictionally engage said fly wheel, a lever to which said brake band is attached, a brake releasing arm affixed to said brake applying lever, a latch member engaging the brake release arm, a hinged apron, and an electric switch positioned to be actuated by the latch member and arranged to turn off the source of current supply that operates the machine simultaneously with the application of the brake band to the fly wheel.

6. In a safety device of the type described, the combination with a dough rolling machine having a fly wheel, of a brake band adapted to frictionally engage said fly wheel, an adjustable weighted lever to which said brake band is attached, a brake release lever affixed and disposed at an angle to said brake applying lever, a latch member engaging the brake release lever, a swingable apron arranged to apply the brake band, and an electric switch positioned to be actuated by the aforesaid member and arranged to turn off the source of current supply that operates the machine simultaneously with the application of the brake band to the fly wheel.

7. In a safety device of the type described, the combination with a dough rolling machine having a fly wheel, of a brake band adapted to frictionally engage said fly wheel, an adjustable weighted lever to which said brake band is attached, a brake release lever affixed to said brake applying lever, a spring controlled latch member engaging the brake release lever, and a manually operable swingable apron arranged to apply the brake band, and an electric switch positioned to be actuated by the aforesaid member and arranged to turn off the source of current supply that operates the machine simultaneously with the application of the brake band to the fly wheel.

8. In a safety device of the type described, the combination with a dough rolling machine having a fly wheel, of a brake band adapted to frictionally engage said fly wheel, an adjustable weighted lever to which said brake band is attached, brake releasing arm affixed to said brake applying lever, a latch member engaging the brake release arm, and a swingable apron arranged to actuate the latch member and a push button electric switch positioned to be actuated by the aforesaid member and arranged to turn off the source of current supply that operates the machine simultaneously with the application of the brake band to the fly wheel.

9. In a safety device for a dough rolling machine, the combination of a swinging depending apron, a U-bar latch arranged to be actuated by the apron, a push button electric switch adapted to be simultaneously actuated by the U-bar latch, a brake release lever adapted to be released by the actuation of the latch member, and a brake for the operating mechanism of the dough rolling machine arranged to be applied on release of the brake releasing lever.

10. In a safety device for a dough rolling machine, the combination of a manually operable swinging depending apron, a latch arranged to be actuated by the apron, a push button electric switch adapted to be actuated by the latch, a latch releasing device arranged to be simultaneously actuated by the apron, a brake release lever adapted to be released by the actuation of the latch member, a brake for the operating mechanism of the dough rolling machine arranged to be applied on release of the brake releasing lever, said brake mechanism comprising a brake band clamped at one end of the floor or base of the machine, and an adjustable weighted brake-applying arm to which the other end of the brake band is attached, said brake band being positioned to engage a fly wheel of the dough rolling machine.

JOSIE C. BAREFOOT.